United States Patent
Fritsch et al.

(10) Patent No.: US 10,935,446 B2
(45) Date of Patent: Mar. 2, 2021

(54) LOAD CELL AND WEIGHING FOOT

(71) Applicant: Bizerba SE & Co. KG, Balingen (DE)

(72) Inventors: Andreas Fritsch, Balingen (DE); Annika Gutmacher, Balingen (DE); Jens Eschment, Bisingen (DE); Frank Metzger, Albstadt (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 16/723,056

(22) Filed: Dec. 20, 2019

(65) Prior Publication Data

US 2020/0200620 A1   Jun. 25, 2020

(30) Foreign Application Priority Data

Dec. 20, 2018  (EP) ..................................... 18214955

(51) Int. Cl.
| | |
|---|---|
| *G01L 1/22* | (2006.01) |
| *G01G 3/14* | (2006.01) |
| *G01L 1/04* | (2006.01) |

(52) U.S. Cl.
CPC .......... *G01L 1/2231* (2013.01); *G01G 3/1408* (2013.01); *G01L 1/04* (2013.01); *G01G 3/141* (2013.01)

(58) Field of Classification Search
None
See application file for complete search history.

(56) References Cited

U.S. PATENT DOCUMENTS

| | | |
|---|---|---|
| 5,024,107 A | 6/1991 | Bethe |
| 7,261,254 B2 | 8/2007 | Mindler |
| 7,441,470 B2 | 10/2008 | Morimoto |
| 2008/0178688 A1 | 7/2008 | Hirabayashi |

FOREIGN PATENT DOCUMENTS

| | | |
|---|---|---|
| DE | 35 34 608 a1 | 4/1987 |
| DE | 10 2016 117 539 A1 | 3/2018 |
| EP | 0 266 917 A1 | 5/1988 |
| EP | 0 351 006 A2 | 7/1989 |
| EP | 0 590 713 A2 | 4/1994 |

(Continued)

OTHER PUBLICATIONS

European Search Report in Corresponding European Patent Application 18214955.9 dated Jun. 7, 2019 (three pages).

*Primary Examiner* — Harshad R Patel
*Assistant Examiner* — Nigel H Plumb
(74) *Attorney, Agent, or Firm* — Kilpatrick Townsend & Stockton LLP

(57) ABSTRACT

The invention relates to a load cell with a spring body formed rotationally symmetrically about a center axis, and a plurality of strain gauges arranged on a lower side of the membrane for detecting a stretching and/or compressive deformation of the spring body, wherein the strain gauges are electrically connected to a Wheatstone bridge or as a part thereof, with at least one first strain gauge. The spring body has an outer support ring, an upwardly projecting inner force introduction element, and an annular deformation section that is formed as an annular membrane and with which the support ring and the force introduction element are fixedly connected to one another. The mean thickness of the annular membrane in the region of the first strain gauge or gauges is larger than the mean thickness in the region of a second strain gauge or gauges.

20 Claims, 8 Drawing Sheets

(56) References Cited

FOREIGN PATENT DOCUMENTS

Figure 1:
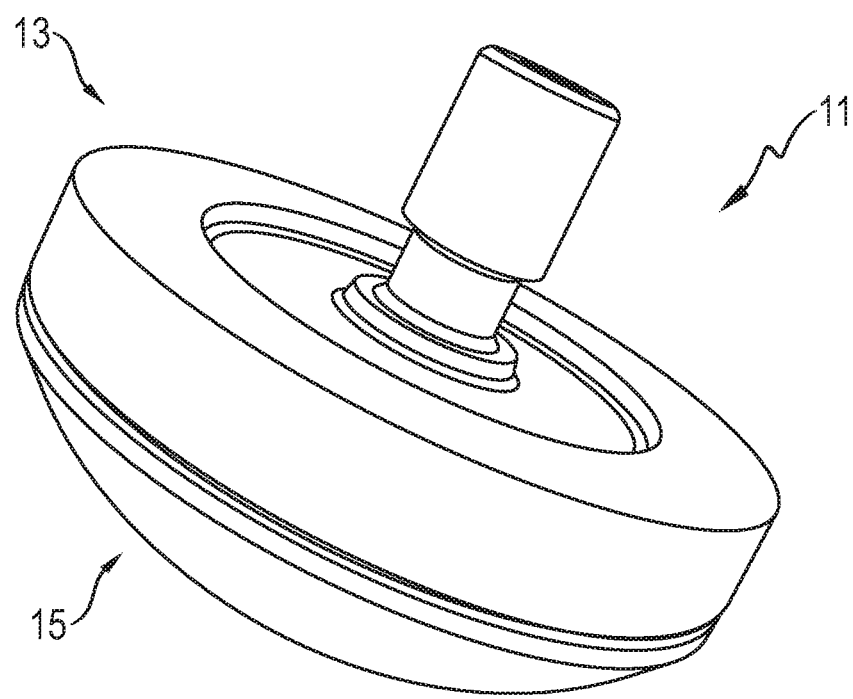

| | | |
|---|---|---|
| EP | 0 640 813 A1 | 3/1995 |
| EP | 1 953 514 A2 | 8/2008 |
| EP | 1 998 150 A1 | 12/2008 |
| EP | 3 093 244 B1 | 11/2016 |
| WO | 00/73757 A1 | 12/2000 |

LOAD CELL AND WEIGHING FOOT

This application claims priority to European Patent Application No. 18214955.9 filed Dec. 20, 2018, the disclosure of which is incorporated by reference herein.

The present invention relates to a load cell, in particular to a weighing foot. The load cell comprises a spring body, in particular a spring body formed rotationally symmetrically about a center axis, having an outer support ring, having an upwardly projecting inner force introduction element, and having an annular deformation section that is formed as an annular membrane that in particular extends below a plane defined by an upper side of the outer support ring and via which the support ring and the force introduction element are fixedly connected to one another; and a plurality of strain gauges, in particular at least four or exactly four strain gauges, arranged on a lower side of the membrane for detecting a stretching and/or compressive deformation of the spring body, wherein the strain gauges are electrically connected to form a Wheatstone bridge or as a part thereof, with at least one first strain gauge, in particular two first strain gauges, being disposed on a first circle having a first radius about the center axis of the spring body and with at least one second strain gauge, in particular two second strain gauges, on a second circle having a second radius that is greater than the first radius about the center axis of the spring body.

Such a load cell, such as is known, for example, from EP 0 640 813 A1, is suitable for installation as a foot in load carriers such as platforms or containers, e.g. in production/manufacture, in warehouses, in shipping, or in sales, and is therefore suitable for the weight detection of different products to be weighed. Since the local strain of the membrane of such a load cell varies in dependence on the radius on the action of a force and since this variation is additionally dependent on the weight acting on the load cell, the determination of the weight value from the resulting bridge voltage of the Wheatstone bridge is comparatively complex and only possible within predefined error thresholds due to the strain gauges arranged at different distances from the center axis.

It is the underlying object of the invention to provide a load cell of the initially named kind that has a higher accuracy.

This object is satisfied by a load cell having the features of claim 1 and in particular in that the mean thickness of the annular membrane in the region of the first strain gauge or gauges is greater than the mean thickness in the region of the second strain gauge or gauges.

It is hereby made possible to adapt the strain of the membrane in the region of the first radius, i.e. in the region of the inner strain gauge or gauges, to the strain of the membrane in the region of the second radius, i.e. in the region of the outer strain gauge or gauges. When loading the load cell with a weight, the inner strain gauge or gauges is/are thus exposed to at least substantially the same strain, in particular by amount, as the outer strain gauge or gauges. This behavior can be attributed to the conditions of the moment of inertia of an area and the distance of the respective region from the force introduction. In other words, it has been found that an analog strain behavior is reached in the two regions when the membrane has at least approximately the same amount of material in the two regions. To achieve this, the larger periphery in the larger radius is compensated by a small thickness in the larger radius. The accuracy of the load cell can hereby be increased. The mean thickness in the region of the first strain gauge or gauges is the mean thickness over the radial extent of the first strain gauge or gauges. The mean thickness in the region of the second strain gauge or gauges is the mean thickness over the radial extent of the second strain gauge or gauges.

To the extent that only one first strain gauge and only one second strain gauge are provided, the Wheatstone bridge is formed as a half-bridge; with two first strain gauges and two second strain gauges it is formed as a full bridge. The first strain gauge or strain gauges is/are preferably a strain gauge or strain gauges subject to tension, i.e. a strain gauge or strain gauges that detect a stretching of the membrane and the second strain gauge or strain gauges is/are a strain gauge or strain gauges subject to compression, i.e. a strain gauge or gauges that detect/detects a compression of the membrane.

The annular membrane is in particular formed as planar at its lower side. It is furthermore particularly preferred if the circular membrane has a rounded extent at its upper side in its transition region to the outer support ring. It has been found that a particularly high accuracy of the load cell can be achieved by such a gentle transition. The circular membrane can furthermore also have a rounded extent at its upper side in its transition region to the inner force introduction element. The circular membrane can in particular in each case have a rounded extent at its upper side in its region to the outer support ring and to the inner force introduction element.

Provision can furthermore be made that the inner force introduction element has an undercut at its lower end. It is hereby achieved that the force introduction takes place as close as possible to the center axis of the spring body. It has been found that a particularly high accuracy of the load cell is hereby achieved.

The thickness of the membrane preferably monotonously decreases from the inside to the outside, in particular reducing linearly or in a stepped manner. A membrane formed in this manner can be manufactured in a particularly simple manner. The production tolerance furthermore increases.

In accordance with an alternative embodiment to this, the thickness of the membrane decreases in the region of the first strain gauge or gauges from the inside to the outside and the thickness in the region of the second strain gauge or gauges increases from the inside to the outside. It has been found that a particularly high accuracy of the load cell is hereby achieved.

It is furthermore preferred if the first strain gauge or gauges is/are arranged overlapping with the inner force introduction element and if the second strain gauge or gauges is/are arranged overlapping with the outer support ring since resistance/load characteristics for the strain gauges are hereby produced that are as linear as possible, whereby the accuracy of the load cell can be increased.

The plurality of strain gauges can each have a measurement grid oriented in the radial direction, i.e. the measurement direction of the strain gauges is respectively aligned in a radial direction. This increases the symmetry of the arrangement and simplifies the evaluation of the bridge signal of the Wheatstone bridge.

In accordance with an embodiment, a first and a second strain gauge can be respectively arranged on two mutually oppositely disposed sides of the force introduction element. Due to the symmetry associated herewith, the Wheatstone bridge is less susceptible to at least specific deviations in production since they can then at least partly mutually compensate one another. The strain gauges in this arrangement can furthermore be particularly simply attached to the membrane.

The four strain gauges can in particular be arranged along a common line through the center axis of the spring body. Alternatively, the two first strain gauges can be arranged along a first line through the center axis of the spring body and the two second strain gauges can be arranged along a second line through the center axis of the spring body, with the two lines being rotated with respect to one another by an angle in the range from 5° to 20°. It is hereby made possible to position the two strain gauges respectively arranged on the same side particularly closely to one another so that the membrane used can be formed in a particularly compact manner.

The membrane can furthermore be provided with a peripheral annular web at the upper side and in a center section. The strain gauges are preferably arranged at a point at which a stretching or compression of the spring body that is as strong as possible takes place on a force introduction to generate a signal that is as high as possible. The width of the point at which the greatest stretching or compression takes place can be increased by the peripheral annular web. The annular web, that is not a component of the membrane, can also extend up to and above the plane defined by the upper side of the outer support ring.

The load cell can furthermore comprise an evaluation circuit that is electrically connected to the strain gauges and that is configured to generate an output signal corresponding to a weight acting on the force introduction element, with the evaluation circuit preferably being provided at the force introduction element. In this respect, an external interface can be provided that is electrically connected to the evaluation circuit and that is configured to output the output signal generated by the evaluation circuit to external, with the external interface preferably being provided at the force introduction element.

The force introduction element can be formed as a force introduction pipe. The aforesaid evaluation circuit and/or the aforesaid external interface can then be arranged in the interior of the force introduction pipe. The interior of the force introduction pipe can in particular form a cable guide.

It is particularly preferred if the spring body is configured as monolithic, in particular as a rotating part. The spring body is thus not a complex component composed of a plurality of single parts. The spring body can thus be manufactured comparatively simply The present invention furthermore relates to a weighing foot having a load cell as has been described above.

It is particularly preferred here if the force introduction element has an external thread at its upper end. The weighing foot can therefore easily, also subsequently, be screwed to any desired load carriers such as load plates, pallets, crates, shelves, shelf racks, table feet, or the like.

The weighing foot preferably comprises a lower part, in particular of spherical segment shape, on which the outer support ring of the load cell is supported. It is preferred here if the lower part downwardly hermetically tightly seals the lower part for protection from foreign bodies and water.

The present invention furthermore relates to a weighing system having a plurality, in particular two or four, weighing feet such as have been described above, and having a load carrier supported on the plurality of weighing feet.

Further advantageous embodiments of the invention are described in the claims, in the description of the Figures, and in the drawing.

Figure 2:
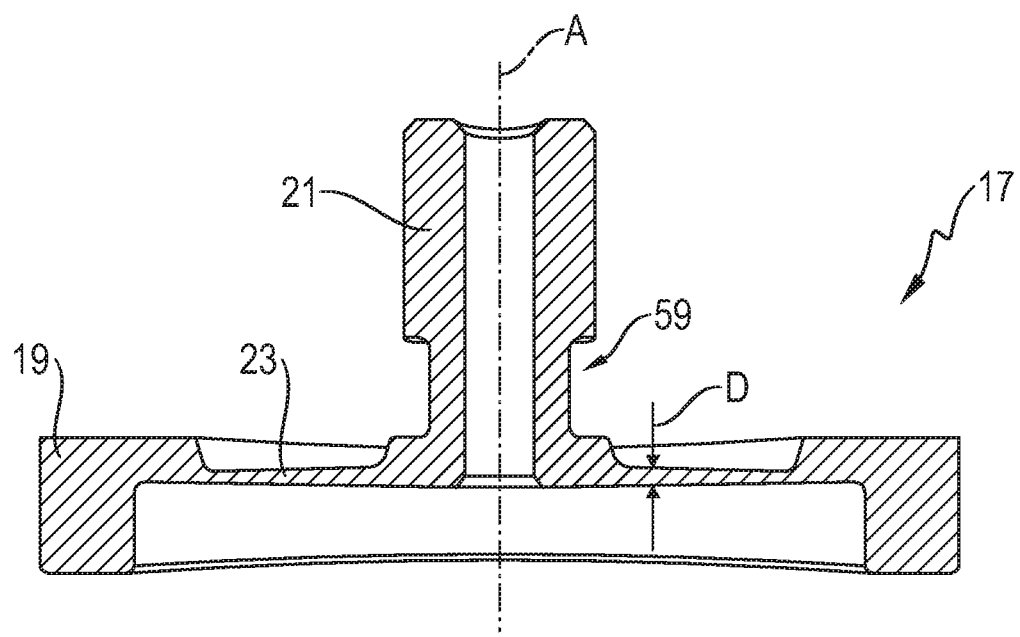
Figure 3:
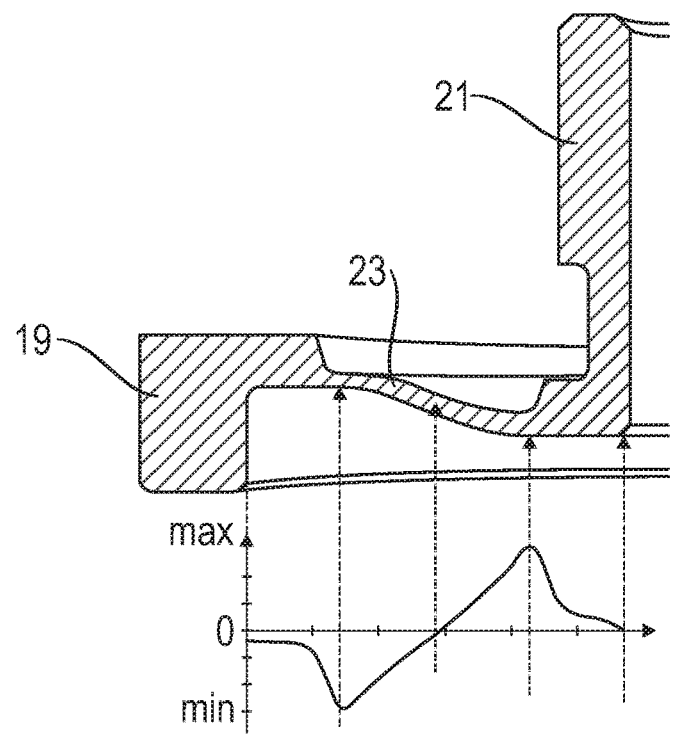
Figure 4:
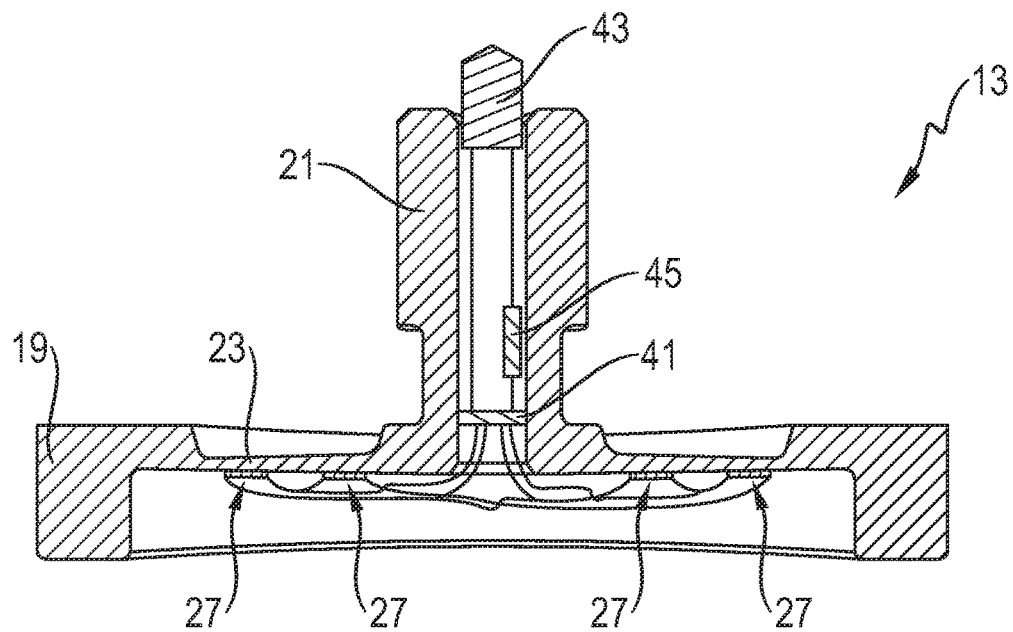
Figure 5A:
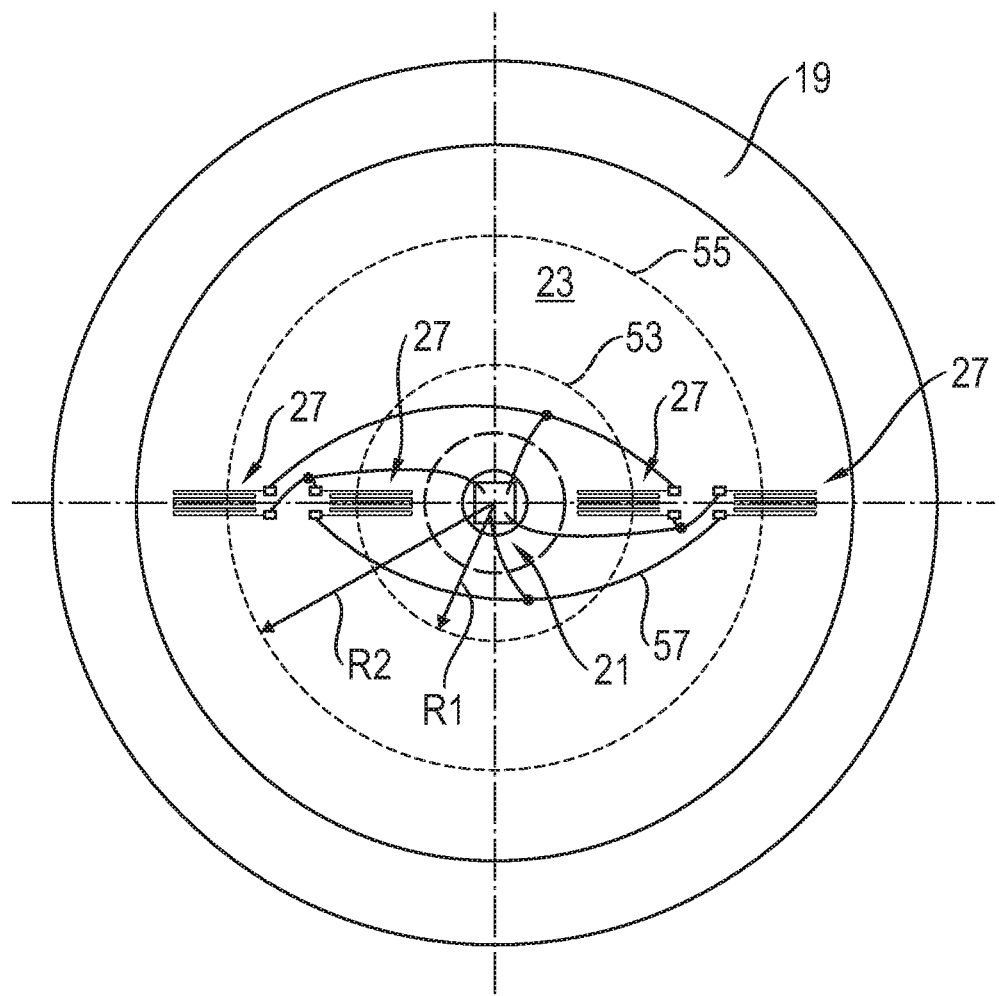
Figure 5B:
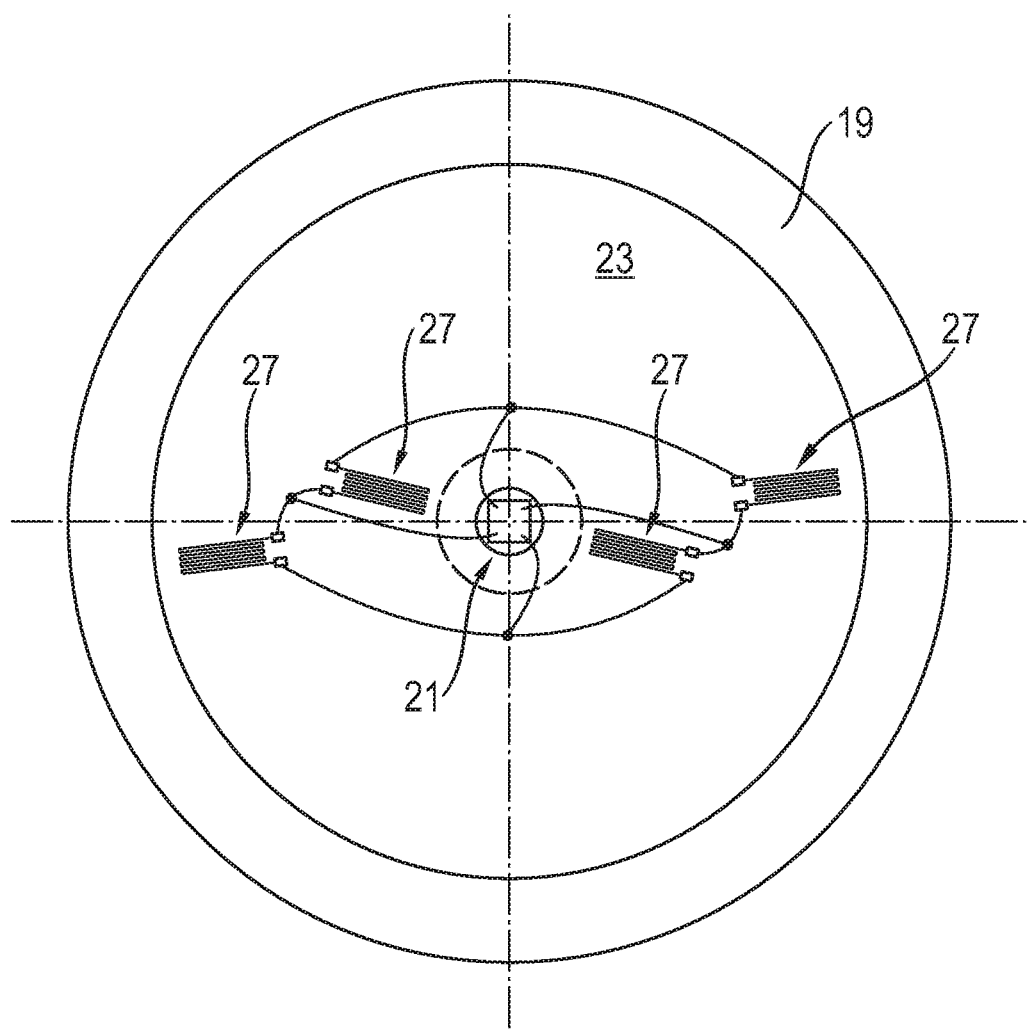
Figure 6:
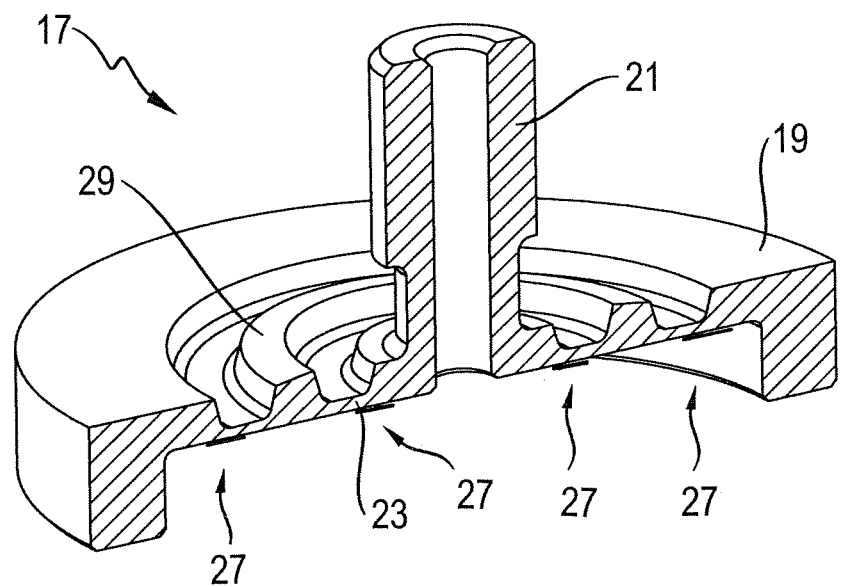
Figure 7:
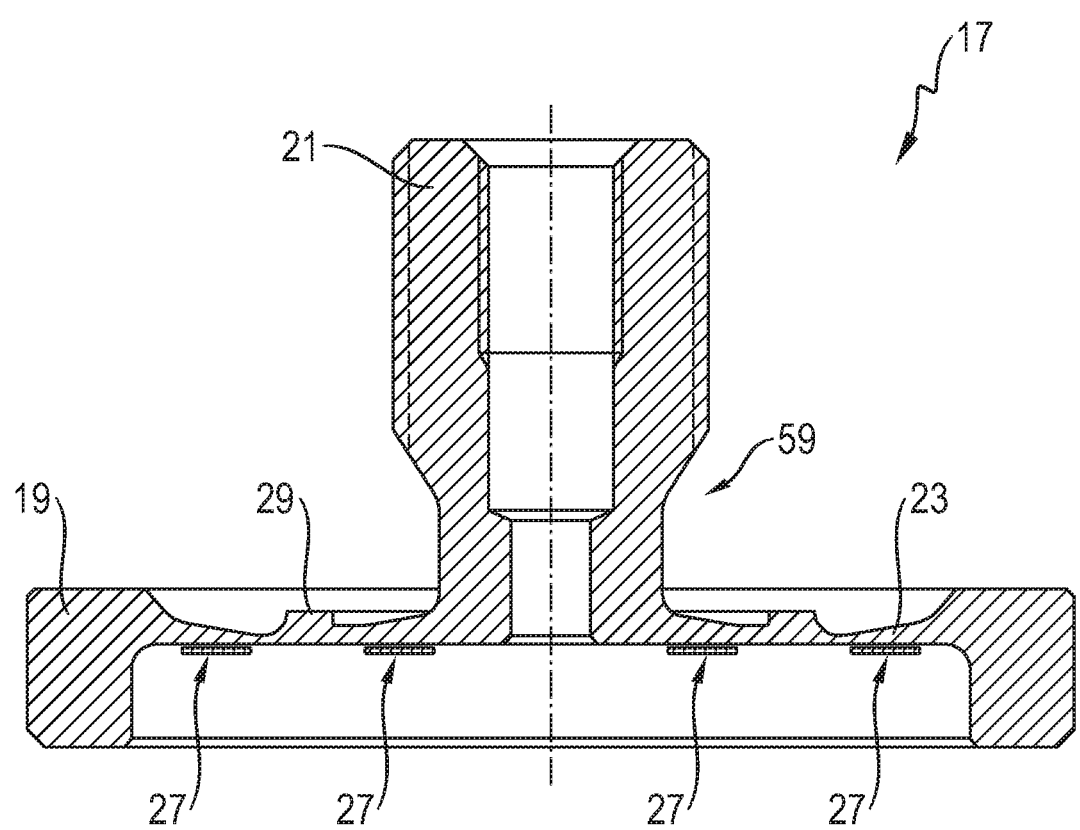
Figure 8:
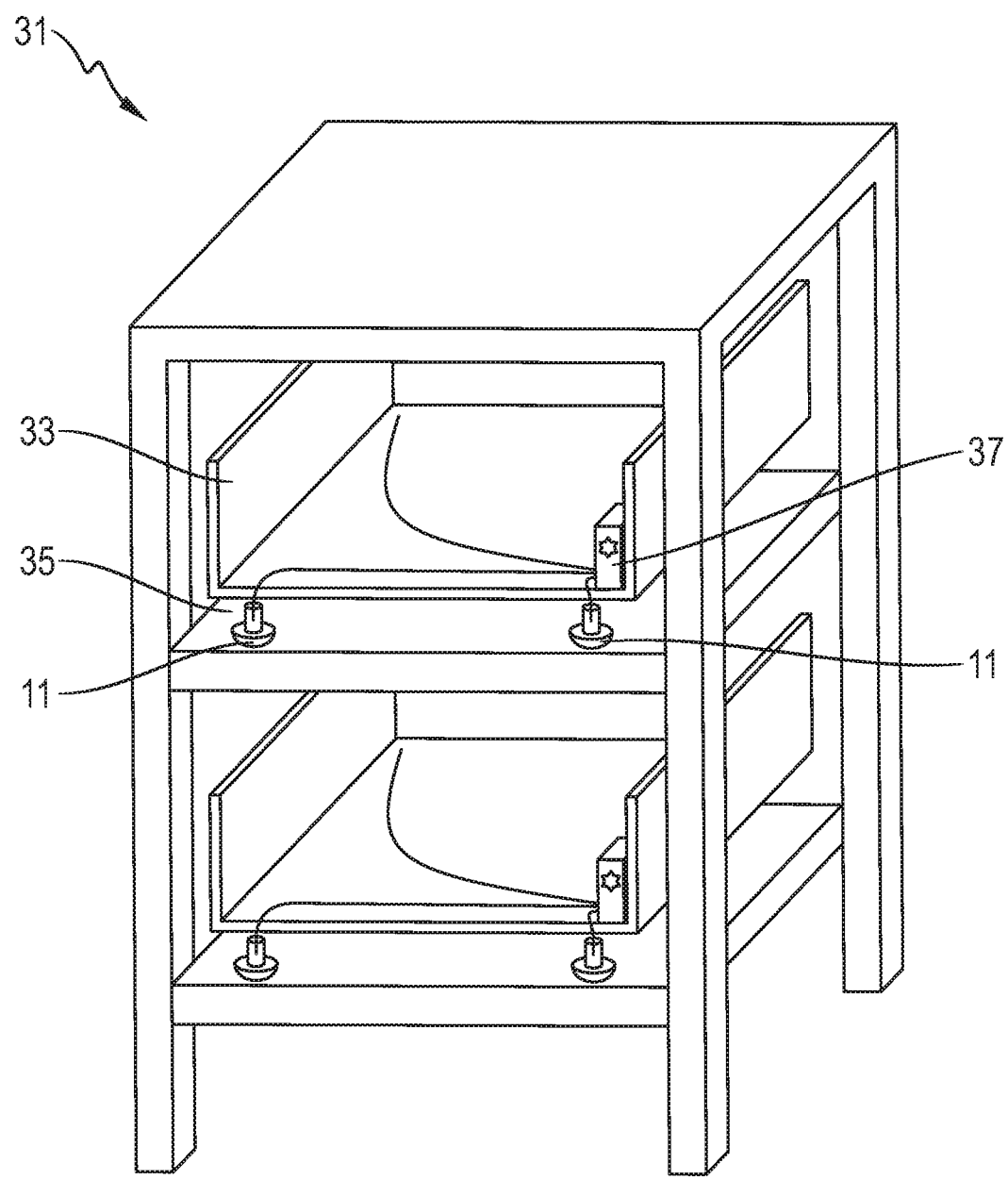

The invention will be described in the following by way of example with reference to the drawing. There are shown FIG. 1 a weighing foot in accordance with the invention in a perspective view;

FIG. 2 a spring body in cross-section;

FIG. 3 a part view of the spring body of FIG. 2 under the action of a weight load;

FIG. 4 the spring body of FIG. 2 with strain gauges attached to the lower side;

FIG. 5A a view from below of the spring body in accordance with FIG. 4, with the strain gauges having a first arrangement;

FIG. 5B the spring body of FIG. 2, but with the strain gauges having a second arrangement;

FIG. 6 the spring body of FIG. 2 that is additionally provided with a peripheral annular web at the upper side;

FIG. 7 a spring body in accordance with a further embodiment in cross-section;

FIG. 8 a load weighing system in accordance with the invention; and

Figure 9:
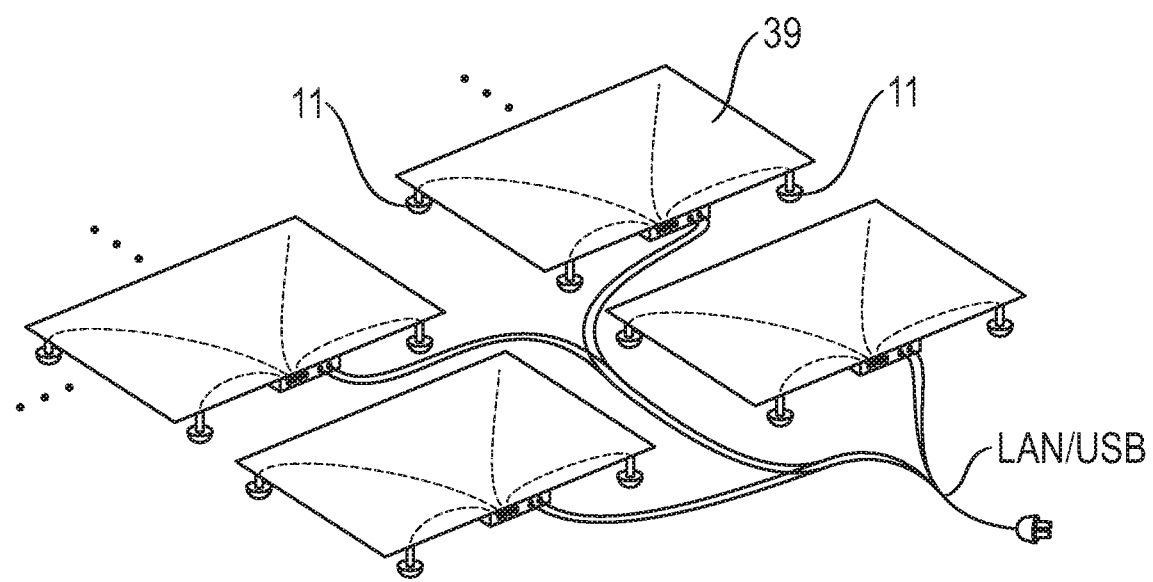

FIG. 9 a further weighing system in accordance with the invention.

The weighing foot 11 in accordance with the invention shown in FIG. 1 comprises a load cell 13 in accordance with the invention and a lower part 15 that has the shape of a spherical segment, is configured as a solid body, and on which the load cell 13 is supported. The load cell 13 comprises a spring body 17 that is formed as monolithic and is rotationally symmetrical about a center axis A (cf. FIG. 2). The spring body 17 comprises an outer support ring 19 and an upwardly projecting inner force introduction element 21. The outer support ring 19 and the inner force introduction element 21 are fixedly connected to one another via an annular deformation section 23. The connection between the load cell 13 and the lower part 15 is such that the load cell 13 is supported on the lower part 15 via the outer support ring 19 and the deformation section 23 is downwardly hermetically tightly sealed by the lower part 15.

The annular deformation section 23 is formed as an annular membrane 23. The inner force introduction element 21 is formed as a vertically oriented force introduction pipe 21 at whose upper end an external thread is provided via which the weighing foot 11 an be screwed into a load carrier from below.

If a weight force acts on the spring body 17 via the force introduction pipe 21, the force introduction pipe 21 moves, in particular relative to the stationary outer support ring 19, slightly vertically downwardly, with the membrane 23 of the spring body 17 deforming in the manner shown in FIG. 3. In the lower half of FIG. 3, a diagram is shown that the shows the strain distribution of the spring body 17, i.e. the strain of the spring body 17 in dependence on the respective radial position. As in particular results from this diagram with reference to the shown maximum or minimum of the curve representing the strain distribution, the lower side of the spring body 17 undergoes a stretching (positive strain) on a load in the region of the transition to the force introduction pipe 21 and a compression (negative strain) in the region of the transition to the outer support ring 19. The curve shown has a zero point between the maximum and the minimum.

This deformation of the spring body 17 can be detected via four strain gauges 27 that are attached to the planar lower side of the membrane 23, that are in particular arranged in the two aforesaid regions, and whose electrical resistance changes in dependence on the strain (cf. FIG. 4), with two respective strain gauges 27 being arranged at two mutually oppositely disposed sides of the force introduction pipe 21.

As results from a comparison with FIG. 3, the two inwardly disposed strain gauges 27 are strain gauges subject to tension that detect a stretching of the membrane 23 and the two outwardly disposed strain gauges 27 are strain gauges subject to compression that detect a compression of the membrane 27.

As shown in more detail in FIG. 5A, the four strain gauges 27 are electrically connected via bond wires 57 (of which only one is provided with a reference numeral for reasons of clarity) to form a Wheatstone full bridge, with the measurement grids of the strain gauges 27 each being oriented in a radial direction, i.e. the measurement direction of the strain gauges 27 is in a radial direction in each case. The two inner strain gauges 27 subjected to tension are disposed on a first circle 53 having a first radius R1 and the two outer strain gauges 27 subjected to compression are disposed on a second circle 55 having a larger second radius R2. The four strain gauges 27 are here arranged along a common line through the center axis A of the spring body 17. The production tolerance can be increased by the linear arrangement of the strain gauges 27 and the symmetry associated therewith since then at least specific production deviations can mutually compensate one another.

It can be seen from FIG. 5B that the strain gauges 27 can also be positioned slightly differently from the linear arrangement in accordance with FIG. 5A, in particular such that the two inner strain gauges 27 are arranged along a first line and the two outer strain gauges 27 are arranged along a second line through the center axis A of the spring body 17, with the two lines being slightly rotated with respect to one another. It is hereby made possible to reduce the radial spacing of the two strain gauges 27 arranged next to one another on one side such that a spring body 17 having a smaller diameter can be selected, whereby the load cell 13 can be designed in more compact form. The advantage of higher production tolerance stated in connection with the linear arrangement in accordance with FIG. 5A is retained here, i.e. is largely maintained with a slightly deviating positioning.

As can in particular be recognized from FIG. 2, the mean thickness D of the annular membrane 23 is larger in the region of the smaller first radius R1, i.e. with the two inner strain gauges 27, that in the region of the second radius R2, i.e. with the two outer strain gauges 27. It is hereby made possible that the same or at least similar strains are obtained in amount in both regions so that the resistance/load characteristics of the two inner strain gauges 27, on the one hand, and the resistance/load characteristics of the two outer strain gauge 27, on the other hand, at least substantially correspond to one another in amount—despite different radii. The evaluation of the bridge voltage of the bridge circuit is hereby facilitated and the accuracy of the load cell 13 is increased.

The greater thickness of the membrane 23 further inwardly in comparison with further outwardly can be due to the ratios of moment of inertia of an area and the spacing of the respective region to the force introduction. Formulated in illustrative or simplified form, a small thickness is required in the region of the larger second radius R2 due to the larger periphery to arrive at the same material volume and thus at an analog strain behavior as in the region of the smaller first radius R2 having the smaller periphery.

In accordance with the embodiment shown, the thickness of the membrane 23 decreases monotonously, in particular linearly, from the inside to the outside. Such a membrane 23 can be manufactured in a particularly simple manner. However, other transitions from the larger inner thickness to the smaller outer thickness are generally conceivable, for example a step-like reduction.

At its upper side, the annular membrane 23 respectively has a rounded extent in its transition region to the outer support ring 19 and in its transition region to the inner force introduction element 21. The inner force introduction element 21 furthermore has an undercut 59 at its lower end such that the force introduction takes place as closely as possible to the center axis A of the spring body 17. The accuracy of the load cell 13 can hereby be considerably further improved in each case.

The strain gauges 27 are electrically connected to an evaluation circuit 41 (cf. FIG. 4) that calculates in a manner known per se the weight respectively acting on the load cell 13 from the bridge voltage of the strain gauges 27 connected to form the full bridge and generates a corresponding output signal. The evaluation circuit 41 is here arranged within the force introduction pipe 21.

As is shown in FIG. 4, the output signal of the evaluation circuit 41 can, for example, be output to external, in particular to a load carrier such as is described above and below, via a plug 43 that is electrically connected to the evaluation circuit 41. The plug 43 is here arranged within the force introduction pipe 21. If the weighing foot 11 is screwed via the force introduction pipe 21 or via its external thread from below into a load carrier, this has the advantage that the output signal can be output directly and over the shortest path to the load carrier or to a weighing terminal of the load carrier and can be displayed there without external cables or the like additionally being required for this purpose, as would be the case if the output signal were output to external at the support ring side. Other external interfaces, in particular contactless means such as a transmitter that can, for example, be based on the NFC standard, can in another respect also be considered as further means for the external output of the output signal.

Provision can in particular be made with a contactless configuration of the interface between the weighing foot 11 and the load carrier that an internal electrical energy store 45 such as a battery is provided to form the load cell 13 or the weighing foot 11 independently, i.e. autonomously, of an external energy supply. The electrical energy store 45 is then preferably likewise arranged within the force introduction pipe 21.

A further embodiment of a spring body 17 is shown in FIG. 6. In contrast with the spring body 17 in accordance with FIGS. 1 to 4, the membrane 23 of the spring body 17 in accordance with FIG. 6 is provided at its upper side with a peripheral annular web 29 that is arranged at least substantially centrally of the membrane 23 in the radial direction. It has been found that the width of the maximum and the width of the minimum of the strain distribution of the spring body 17 shown in FIG. 3 can hereby be increased. The production tolerance can thereby be increased. It has furthermore been found that it can in particular be advantageous on a presence of the annular web 29 if the two inner strain gauges 27 are arranged overlapping with the inner force introduction pipe 21 and if the two outer strain gauges 27 are arranged overlapping with the outer support ring 19 to obtain dependencies of the relative resistance changes on the strain that are as linear as possible to increase the accuracy of the load cell 13.

A further spring body 17 is shown in a slightly different embodiment in FIG. 7. The spring body 17 in accordance with FIG. 7 differs from the spring body 17 in accordance with FIG. 2 in that the thickness of the membrane 23 in the region of the two inner strain gauges 27 decreases from the inside to the outside and increases from the inside to the outside in the region of the two outer strain gauges 27. The mean thickness D of the membrane 23 in the region of the two inner strain gauges 27 is here, however, still—and thus in accordance with the invention—larger than the mean thickness D of the membrane 23 in the region of the two outer strain gauges 27. The peripheral annular web 29 is furthermore less high, unlike in the embodiment in accordance with FIG. 6.

FIGS. 8 and 9 show two different applications of the weighing foot 11 in accordance with the invention. In FIG. 8, a supermarket shelf 31 is shown having by way of example two shelf racks 33 that are each set on a shelf bottom 35 via e.g. four weighing feet 11. The total weight of the respective shelf rack 33, including the products located therein, for example bread, can be determined by a respective monitoring device 37 that is connected to all the weighing feet 11 of the respective shelf rack 33. The "filling level" of the shelf rack 33 can hereby be monitored. If the total weight of the shelf rack 33 falls below a predefined value, i.e. a display integrated in the monitoring device 37 or separate therefrom can, for example, light up to indicate this state. A plurality of platforms 39, for example pallets such as can be present in a warehouse, are shown in FIG. 9. The platforms 39 are each supported on four weighing feet 11 to determine the total weight of the respective platform 39 including the products arranged thereon. If the same products are stacked on all the platforms 39, the total weights of all the platforms can be combined in a wired or wireless manner, e.g. by wireless LAN, whereby a permanent inventory of the respective product is possible.

REFERENCE NUMERAL LIST 11 weighing foot
13 load cell
15 lower part
17 spring body
19 support ring
21 force introduction pipe
23 membrane
27 strain gauge
29 annular web
31 shelf
33 shelf rack
35 shelf bottom
37 monitoring device
39 platform
41 evaluation circuit
43 plug
45 electrical energy store
53 first circle
55 second circle
57 bond wire
59 undercut
A center axis
D thickness
R1 first radius
R2 second radius

The invention claimed is:
1. A load cell comprising
a spring body formed rotationally symmetrically about a center axis, the spring body comprising an outer support ring, an upwardly projecting inner force introduction element, and an annular deformation section that is formed as an annular membrane, wherein the outer support ring and the force introduction element are fixedly connected to one another with the annular membrane; and
a plurality of strain gauges arranged on a lower side of the annular membrane configured for detecting a stretching and/or compressive deformation of the spring body, wherein the plurality of strain gauges are electrically connected to form at least a part of a Wheatstone bridge,
wherein at least one first strain gauge of the plurality of strain gauges is disposed on a first circle having a first radius about the center axis of the spring body and at least one second strain gauge of the plurality of strain gauges is disposed on a second circle having a second radius that is greater than the first radius about the center axis of the spring body,
wherein a first mean thickness of the annular membrane in a first region of the at least one first strain gauge is larger than a second mean thickness of the annular membrane in a second region of the at least one second strain gauge, and
wherein the at least one first strain gauge overlaps the inner force introduction element and the annular membrane and the at least one second strain gauge is overlaps the outer support ring and the annular membrane.

2. The load cell in accordance with claim 1,
wherein the at least one first strain gauge comprises two first strain gauges, wherein the two first strain gauges are disposed on the first circle.

3. The load cell in accordance with claim 1,
wherein the at least one second strain gauge comprises two second strain gauges, wherein the two second strain gauges are disposed on the second circle.

4. The load cell in accordance with claim 1,
wherein the annular membrane is formed as planar at its lower side.

5. The load cell in accordance with claim 1,
wherein the annular membrane has a rounded extent at its upper side in at least one of its transition region to the outer support ring and its transition region to the inner force introduction element.

6. The load cell in accordance with claim 1,
wherein the force introduction element has an undercut at its lower end.

7. The load cell in accordance with claim 1,
wherein the thickness of the annular membrane monotonously decreases from the inside to the outside.

8. The load cell in accordance with claim 1,
wherein the thickness of the annular membrane decreases from the inside to the outside in the region of the at least one first strain gauge and increases from the inside to the outside in the region of the at least one second strain gauge.

9. The load cell in accordance with claim 1,
wherein the plurality of strain gauges each have a measurement grid oriented in a radial direction.

10. The load cell in accordance with claim 1,
wherein a first strain gauge of the at least one first strain gauge and a second strain gauge of the at least one second strain gauge are respectively arranged on two mutually oppositely disposed sides of the force introduction element.

11. The load cell in accordance with claim 10,
wherein the plurality of strain gauges comprises four strain gauges arranged along a common line through the center axis of the spring body.

12. The load cell in accordance with claim 1,
wherein two strain gauges of the at least one first strain gauges are arranged along a first line through the center axis of the spring body and two strain gauges of the at least one second strain gauges are arranged along a second line through the center axis of the spring body, with the two lines being rotated with respect to one another by an angle from 5° to 20°.

13. The load cell in accordance with claim 1,
wherein the annular membrane is provided in a central region with a peripheral annular web at an upper side.

14. The load cell in accordance with claim 1,
wherein the load cell comprises an evaluation circuit that is electrically connected to the plurality of strain gauges and that is configured to generate an output signal corresponding to a weight acting on the force introduction element.

15. The load cell in accordance with claim 14, further comprising an external interface electrically connected to the evaluation circuit and configured to output the output signal generated by the evaluation circuit to a device external to the load cell.

16. The load cell in accordance with claim 1,
wherein the force introduction element is configured as a force introduction pipe; and/or wherein the spring body is configured in monolithic form.

17. A weighing foot having a load cell, the load cell comprising:
a spring body formed rotationally symmetrically about a center axis, the spring body comprising an outer support ring, an upwardly projecting inner force introduction element, and an annular deformation section that is formed as an annular membrane, wherein the outer support ring and the force introduction element are fixedly connected to one another with the annular membrane; and
a plurality of strain gauges arranged on a lower side of the annular membrane configured for detecting a stretching and/or compressive deformation of the spring body, wherein the plurality of strain gauges are electrically connected to form at least a part of a Wheatstone bridge,
wherein at least one first strain gauge of the plurality of strain gauges is disposed on a first circle having a first radius about the center axis of the spring body and at least one second strain gauge of the plurality of strain gauges is disposed on a second circle having a second radius that is greater than the first radius about the center axis of the spring body,
wherein a first mean thickness of the annular membrane in a first region of the at least one first strain gauge is larger than a second mean thickness of the annular membrane in a second region of the at least one second strain gauge, and
wherein the at least one first strain gauge overlaps the inner force introduction element and the annular membrane and the at least one second strain gauge is overlaps the outer support ring and the annular membrane.

18. The weighing foot in accordance with claim 17,
wherein the force introduction element comprises an external thread at an upper end of the force introduction element.

19. The weighing foot in accordance with claim 17,
wherein the weighing foot comprises a lower part on which the outer support ring of the load cell is supported.

20. A weighing system comprising a plurality of weighing feet, and a load carrier supported on the plurality of weighing feet, wherein each weighing foot comprising a load cell, wherein each load cell comprises:
a spring body formed rotationally symmetrically about a center axis, the spring body comprising an outer support ring, an upwardly projecting inner force introduction element, and an annular deformation section that is formed as an annular membrane wherein the outer support ring and the force introduction element are fixedly connected to one another with the annular membrane; and
a plurality of strain gauges arranged on a lower side of the annular membrane configured for detecting a stretching and/or compressive deformation of the spring body, wherein the plurality of strain gauges are electrically connected to form at least a part of a Wheatstone bridge,
wherein at least one first strain gauge of the plurality of strain gauges is disposed on a first circle having a first radius about the center axis of the spring body and at least one second strain gauge of the plurality of strain gauges is disposed on a second circle having a second radius that is greater than the first radius about the center axis of the spring body,
wherein a first mean thickness of the annular membrane in a first region of the at least one first strain gauge is larger than a second mean thickness of the annular membrane in a second region of the at least one second strain gauge, and
wherein the at least one first strain gauge overlaps the inner force introduction element and the annular membrane and the at least one second strain gauge is overlaps the outer support ring and the annular membrane.

* * * * *